Sept. 26, 1961 A. TRUSSELL 3,001,709

ELECTRONIC SQUARE ROOT DEVICE

Filed Dec. 18, 1956 2 Sheets-Sheet 1

INVENTOR
ALEC TRUSSELL
BY Hane and Nydick
ATTORNEYS

Sept. 26, 1961 A. TRUSSELL 3,001,709

ELECTRONIC SQUARE ROOT DEVICE

Filed Dec. 18, 1956 2 Sheets-Sheet 2

INVENTOR
ALEC TRUSSELL
BY Hane and Nydick
ATTORNEYS

3,001,709
ELECTRONIC SQUARE ROOT DEVICE

Alec Trussell, Letchworth, England, assignor to International Computers and Tabulators Limited, London, England Filed Dec. 18, 1956, Ser. No. 629,001
Claims priority, application Great Britain Dec. 28, 1955
5 Claims. (Cl. 235—158)

This invention relates to apparatus for calculating the square roots of decimal numbers.

In the normal method of "paper and pencil" calculation of square roots, the digits of the number (or dividend) are paired off from the decimal point. A first quotient digit is then chosen by inspection, such that it is the largest digit of which the square can be subtracted from the first pair of dividend digits to leave a positive remainder. The next pair of digits are then brought down to form a new remainder. The first quotient digit is doubled and shifted one place to the left. The sum of the shifted first quotient digit and the second quotient digit is multiplied by the second quotient digit, and the product is subtracted from the new remainder. The second quotient digit is chosen to give the smallest positive remainder on subtraction of the product. This procedure is repeated to give further quotient digits.

This process is not particularly suitable for use in automatic calculating machines, since it involves selection of the quotient digit from ten possible digits at each stage. However, by modifying the method, the selection can be reduced to a series of subtractions with a test of the sign of the remainder after each subtraction.

The object of the invention is to provide apparatus for automatically calculating square roots of decimal numbers.

According to the invention apparatus for calculating the square root of a decimal dividend, in which a result digit related to a pair of dividend digits is calculated during each of a plurality of major cycles, each major cycle including one or more subtracting cycles, includes a two input subtractor, detecting means adapted to be operated when the subtractor produces a negative remainder, a counter adapted to have the value registered therein increased by unity for each subtraction cycle, means operable to apply to one input of the subtractor on each subtraction cycle unity plus twice the value registered by the counter, and means adapted, upon operation of the detecting means, to initiate a major cycle and to reset the counter to zero.

The apparatus may operate on values the successive digits of which are represented by successively occurring electrical signals and may include storage means for storing representations of the dividend value, a remainder value and a result value respectively, a two input subtractor, cycle control means operable to perform a series of major cycles, each of which includes one or more subtraction cycles, a counter operable by the control means to count the number of subtraction cycles in each major cycle, means operative to apply to the first input of the subtractor signals representing the sum of a predetermined pair of digits registered in the dividend store and the value registered in the remainder store on the first subtraction cycle of each major cycle and signals representing the value registered in the remainder store on any subsequent subtraction cycles, means operative to apply to the second input of the subtractor signals representing the sum of the value registered by the result store, twice the value registered by the counter and unity, means for registering the output signals from the subtractor in the remainder store, and detecting means adapted to apply a signal to the cycle control means, when value representing signals applied to said first input are greater than the value representing signals applied to said second input, to initiate a major cycle and to register a value in the result store under control of the counter.

The invention will now be described, by way of example, with reference to the accompanying drawings, in which.

Figure 1:
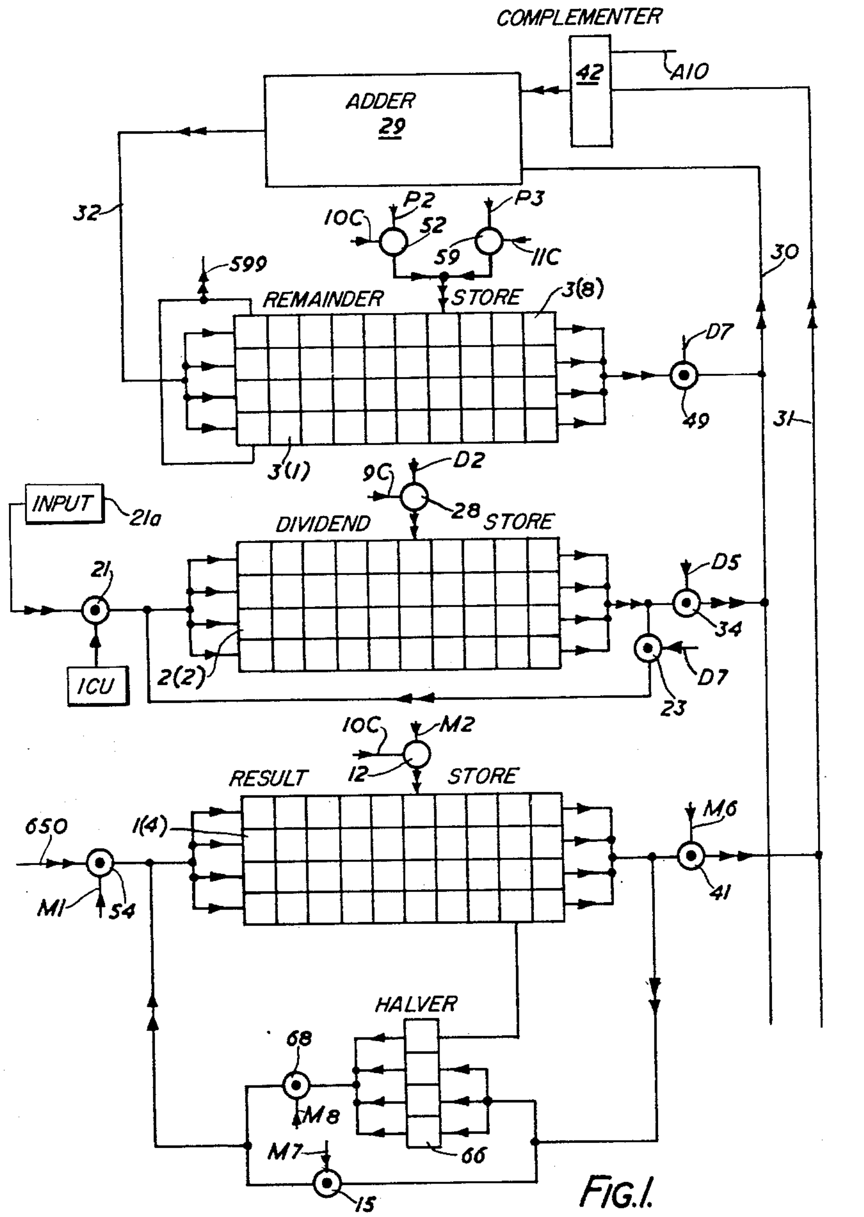
FIGURE 1 is a schematic diagram of an electronic arithmetic unit.

It will be seen that the arithmetic unit of FIGURE 1 is fundamentally the same as that shown in U.S. application Serial No. 427,907 (filed May 6, 1954), now Patent No. 2,954,927 and U.S. application Serial No. 527,738 (filed August 11, 1955), now Patent No. 2,932,450, both of which applications are assigned to the assignee of the instant application, but comprises three 10-stage shifting register stores 1, 2 and 3, each store being capable of holding a ten digit number with each digit expressed in the combinational code 1, 2, 4 and 8 (instead of the 14-stage and 9-stage stores of the reference patent), an adder 29 and a complementer 42 constituting a subtractor, and various gates, referred to in detail hereinafter, which control shifting of values in the registers, and the transfer of digits along highways 30, 31 and 32. A description of the arithmetic unit will also be found in Electronic Engineering for May and August 1955. In the figure, elements corresponding to those appearing in the said U.S. applications referred to, are referenced in the same manner, those elements of the arithmetic unit of such patent which take no part in the square rooting operation or are not essential to an understanding of such operation, being omitted for the sake of clarity. For the sake of clarity, multiple lines in FIGURE 1 are represented by a single line having double arrows and multiple gates are represented by a single symbol with a dot in the centre.

The general method of square rooting will first be considered in relation to this arithmetic unit and the details of the control functions discussed later.

The number of which the square root is to be found, which for convenience will be referred to as the dividend, is entered by any conventional means, e.g. by sensing punched cards in an input unit 21*a*, through gates 21 into the dividend store 2, the other stores being assumed to be empty. The gates 21 are controlled from an input control unit ICU which serves to co-ordinate read-in to the register with other computer functions. The first operational step of the machine is to shift the dividend entry, of which the lowest significant digit is positioned, in conventional manner, at the exit end of the store, until the digits occupying the pair of stages at the left-hand, or entry, end of store 2 are at the exit end of the store. This requires a shift of eight places or stages with the other digits circulating round the store loop.

A major cycle is now commenced, which involves one or more subtraction cycles in which the contents of the remainder store 3 has subtracted from it the contents of the result store 1, plus the value registered by a quotient counter QC in the control unit, plus a supplement of unity supplied from the control unit, the result of the subtraction being entered in the remainder store. The subtraction cycles are identical except for the first one, in which the pair of digits at the exit end of dividend store 2 is fed out from the store to form the initial remainder.

Thus gates 34 of store 2 are opened for the first two shift pulses applied to gate 28 so that the two digits nearest the exit end of store 2 are supplied to the adder 29 over highway 30. Gates 23 being controlled in inverse manner to gates 34 are closed for these first two shift pulses and then are opened for the remaining shift pulses of the train so that the third and subsequent digits of store 2 are circulated through gates 23 back into store 2. Gates 49 of store 3 are controlled in the same manner as gates 23 of store 2 so that the third and subsequent digits of store 3 are applied, in response to shift pulses applied to gates 52 and 59, to the adder 29 over highway 30.

As is explained more fully in connection with the control unit, the read-out of the quotient counter QC (FIGURE 2) provides a value equal to twice the number of subtraction operations, so that it cannot supply an odd digit and the read-out value can thus be applied to highway 31 simultaneously with the supplement digit. Similarly, since the contents of the result store 1 are derived from the read-out of the quotient counter and are also shifted one denomination with respect to this read-out, they can also be simultaneously applied to highway 31.

The opening of gates 41 and 15, as shift pulses are applied to gate 12, shifts the contents of the result store 1 so that they are applied to highway 31 and also re-entered in store 1, the opening of a gate in the control circuit applies the supplement digit to highway 31, and the opening of a further gate in the control circuit applies the count of the counter QC to highway 31.

The highway 31 is connected to adder 29 through a complement circuit 42 which is rendered effective over line A10 so that the digits applied to this highway are subtracted from those applied over highway 30, and the result is fed by a highway 32 to the remainder store 3.

The highest denomination stage of store 3 has connections from its 1 and 8 registers to line 599, which connections are utilized, as described later, to sense when the presence of a "9" in the last stage of the store 3 indicates a complementary entry and thus a negative remainder.

When a negative remainder is sensed further subtractions are prevented, and since a negative remainder indicates that one too many subtraction operations have been performed, the last operation is effectively cancelled out by adding back the last number subtracted. This is achieved by repeating the last operation with the complementer 42 rendered ineffective. At the same time as this add-back step is being performed the contents of the various stores are shifted in preparation for the next subtract step. The number of shift pulses applied during the add-back step is reduced by one and in the case of store 3 the shift pulses are applied through gate 52 only so that an 11th pulse, which is normally supplied through gate 59 to take into account the single pulse delay in the adder, is suppressed. The result of this is to reduce the number of shift pulses applied to store 3 by two so that the remainder produced by the add-back is shifted upwardly by two denominations and the last two digits of the negative remainder previously stored in store 3 remain in the store in the two stages at the right-hand end of the store. Since however gate 49 is not opened for the first two shift pulses of the first subtraction operation of the next subtract step these two digits although read out of the store do not pass to highway 30 and are thus effectively lost. An arrangement described later, in the pulse supply line 9C to gate 28 of store 2 is operated to suppress a further pulse so that in shifting round the return loop, the contents of store 2 are shifted by two places and the next highest pair of digits are positioned at the exit end of this store ready for adding to the shifted remainder from store 3. The reduction of one in the number of shift pulses has the effect of shifting the contents of the result store by one stage. On this cycle the value registered by the quotient counter is entered into the result store over lines 650 and the counter is reset to zero.

The next major cycle is then carried out and the process repeated until the desired number of significant places in the result, as indicated by the initial programming, has been reached. At this point the result register contains a number which is double the desired result, so that in order to obtain the true result a final halving operation has to be performed. This is effected by the halver 66, which is brought into operation by opening gate 68 and closing gate 15 while shift pulses are applied to the result store 1. The contents of store 1 are thus shifted through the halver 66 and back into the store to record the true result of the square rooting operation.

The precise manner in which the foregoing operations of the arithmetic unit are controlled will now be described with reference to the control unit shown in FIGURE 2.

The function of this unit is to distribute D.C. potentials and pulses to the various gates of the arithmetic unit, the D.C. potentials determining a period during which gates are opened to pass pulses applied to them to shift the stored information as desired.

The source of the pulses is a primary timer circuit PT which is fully described in U.S. application Serial No. 427,907.

The timer PT generates clock pulses and renders them available at different outlets at different times in a cycle, which will be referred to as a minor cycle. In the present case 10-stage stores are employed and since store 3 is shifted through the adder 29, thus requiring an additional pulse for a complete shift, eleven shift pulses are needed. The minor cycle is composed of twelve pulses, the additional one pulse being used for switching purposes. The first pulse of the cycle will be referred to as the X pulse and the remainder as pulses 1–11 in their order of occurrence. In the drawings, lines referenced TX, T1, T2 etc. carry pulses of the corresponding timing.

Figure 2:
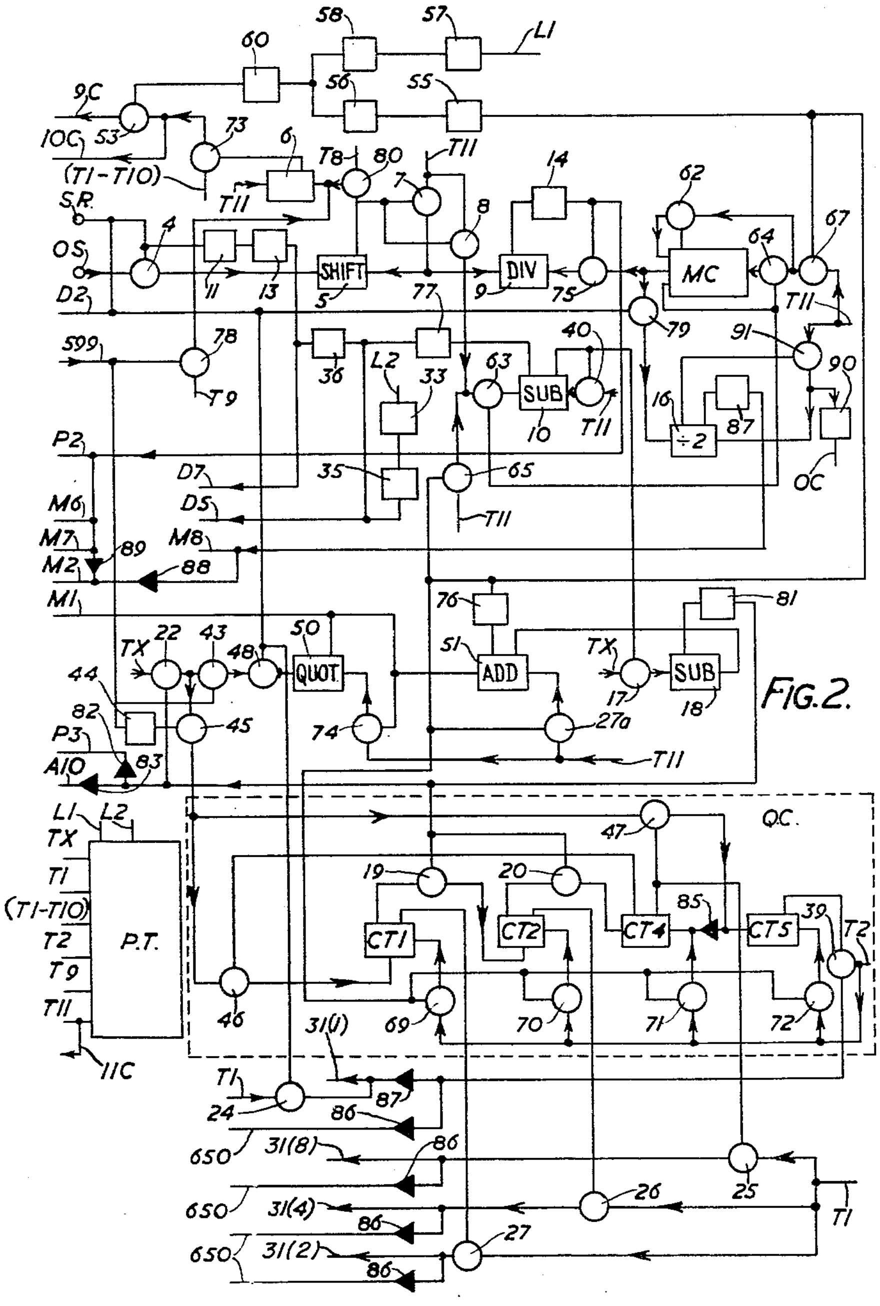
FIGURE 2 is a schematic diagram of an electronic control unit for the arithmetic unit of FIGURE 1.

The complete operation on each pair of digits in the number to be square rooted will be referred to as a major cycle and the completion of each major cycle is registered in a counter MC, indicated as a rectangle in FIGURE 2, and described in detail in the applications referred to above.

To set the apparatus up for square rooting, the programming device, which may be the same as that described in the applications referred to, is appropriately set and this results in the application of a positive potential to line SR and the application of an "operation start" signal to the line OS. It is to be understood that other functions of the programming device and of other parts of the apparatus such as the primary timer, major cycle counter, operation complete and zeroising arrangements, will be as described in the reference applications unless otherwise stated in the following description.

In FIGURE 2 the various elements are indicated schematically as in the reference applications and in connection with the blocks indicating triggers the convention is adopted that a setting input is applied to the left-hand side, an unsetting input is applied to the right-hand side, and a set-or-unset input is applied to the centre of the base. The set-positive/unset negative output is taken from the right-hand side of the top of the block and the unset-positive/set negative output is taken from the left-hand side of the top of the block.

A gate 4 is held open by the potential on the line SR, and passes the signal on the line OS to set a shift trigger 5. This trigger controls the preliminary shifting of the dividend.

A trigger 6 is set at pulse-time 11, coincidentally with the occurrence of the operation start signal, by a pulse on line T11. The set trigger 6 opens a gate 73, to allow pulses to pass from line T1–T10 to the line 10C. The potential of line D2 is raised with the line SR, and that of D7 is raised by the line SR through a pair of inverters 11 and 13. Hence, the gates 28 and 23 (FIGURE 1) are open, and the pulses on the line 10C cause re-circulation of the dividend value in the store 2.

A gate 80 is opened by the set trigger 5. At pulse time 8, a pulse from line T8 passes through the gate 80 and unsets the trigger 6. This closes the gate 73, so that the store 2 receives eight shift pulses only, leaving the two most significant digits of the value in the two least significant positions of the store.

The trigger 5 also opens the gates 7 and 8. A pulse on the line T11 passes through the gate 7, to reset the trigger 5 and to set a divide trigger 9. The trigger 6 is also set at the same pulse time from the line T11. The pulse from the gate 8 is fed to a further gate 63, and from this gate to the setting input of a first subtract trigger 10. The divide trigger 9 remains set during the whole of the square rooting operation, apart from the final halving of the result. The trigger 10 is set for the first subtraction cycle of each major cycle.

The trigger 9, through an inverter 14, raises the potential of lines P2, M2, M6 and M7. The line P2 controls gate 52 (FIGURE 1) to allow shift pulses to be applied to the store 3.

The lines M2, M6 and M7 control gates 12, 41 and 15 respectively, to allow the value in store 1 to be read out to highway 31, and to be re-circulated in the store.

At the next pulse time, a pulse on line TX is fed to a subtract trigger 18 (FIGURE 2) by a gate 17. The gate 17 is opened by the set output of the first subtract trigger 10. The trigger 18 raises the potential of lines P3 and A10, through an inverter 81 and cathode followers 82 and 83. The line P3 opens gate 59 (FIGURE 1) to allow an additional shift pulse to be fed to the store 3. This ensures that a value read in from the adder 29 is correctly positioned in the store, even though the adder introduces a single digit delay. The line A10 conditions the complementer 42 to effect complementing, so that the value in store 1 is subtracted from that in store 3.

The two most significant digits of the dividend are read out from the store 2 during the first subtract cycle. This read-out is controlled by the first subtract trigger 10. The potential of line D5 is raised by an inverter 77, which is driven by the trigger 10. A line L2 is positive during pulse times 1 and 2 only. This line is also connected to the line D5 through inverters 33 and 35. When the potential of the line L2 falls, the output of the inverter 35 falls and lowers the potential of the line D5 to close the gate 34 (FIGURE 1). Thus only two digits are fed to the highway 30 from the store 2.

The input of an inverter 36 is also taken from the line D5. The output of the inverter is connected to the line D7. Hence, whilst the line D5 is high, the inverter 36 lowers the potential of the line D7, overriding the effect of the inverter 13. This closes the gates 23 and 49 (FIGURE 1) thus preventing the two digits which are read out from store 2 on the highway 30 being re-circulated into store 2 and preventing the first two digits in store 3 from being passed to highway 30. After the second shift pulse the potential on line D5 falls thus raising the potential on line D7 and opening gates 23 and 49 for the remainder of the shift pulse train.

The line SR also controls a gate 24 (FIGURE 2), which allows a pulse on the line T1 to be fed to line 31(1) of the highway 31, to enter the supplementary digit.

By way of example, it will be assumed that value 9876543210 was initially entered into the store 2. After the shifting operation, the store will register 7654321098. Thus, on the first subtraction cycle, the value 0000000098 will be read out from the store on to the highway 30 since the store 3 is registering zero. At the end of the subtraction, the store 2 will register 7654321000. The supplementary digit only will be read out on the highway 31, since the result store reads out zero in all digit positions. Thus, unity will be subtracted from 0000000098, and the remainder is entered in the store 3.

On completion of the subtraction, a pulse on the line T11 is passed by gate 40, held open by the trigger 10, to reset the latter trigger.

The number of subtraction cycles is counted by a counter QC, which comprises four trigger stages CT1, CT2, CT4 and CT5. The input to the counter is controlled in the following way. A gate 22 is controlled by the subtract trigger 18, through the inverter 81. The gate receives pulses at X time from the line TX. Since the trigger 18 is also set by a pulse at X time, the first pulse passed by the gate 22 is that which occurs after the first subtraction. The pulse from the gate 22 is fed to a gate 45. This gate is controlled from the line 599, through an inverter 44. The gate is held open as long as nine is not registered in the highest position of the store 3.

The output of the gate 45 passes to a gate 46, which is controlled from the unset side of counter stage CT4, and is therefore, open when the counter registers zero. The pulse from the gate 46 is fed to both grids of the stage CT1, to set it. Hence, the counter registers unity after the first subtraction cycle.

The counter stages CT1, CT2 and CT4 control gates 27, 26 and 25 respectively. These gates receive pulses on the line T1, and are connected to the lines 31(2), 31(4) and 31(8) respectively of highway 31. The gates are open if the corresponding counter stages are set, so that at pulse time 1, twice the value registered by each of the three counter stages is read out on the highway 31.

The counter operates in bi-quinary with 1, 2, 4, 5 stages connected to give the correct doubled read out in the form 2, 4, 8 and 10. Gates 19 and 20 couple the stages CT1 and CT2, CT2 and CT4, respectively, and are held open by the output of the inverter 81. These three stages operate in the normal binary manner, so that, as one is reset, it sets the next. After four pulses, CT4 will be set. This closes the gate 46 to prevent the next pulse reaching CT1. It also opens a gate 47, which receives pulses in common with the gate 46.

The fifth input pulse is passed by the gate 47 to set CT5, and to reset CT4 through a cathode follower 85. The counting cycle is then repeated, since the resetting of CT4 re-opens the gate 46 and closes the gate 47.

The stage CT5 controls a gate 39, which also receives pulses on the line T2. The gate 39 will feed a pulse at pulse time 2 to the line 31(1), whenever CT5 is set, representing one in the tens denomination. For example if the counter is registering seven, the stages CT2 and CT5 will be set. Line 31(4) will receive a pulse at pulse time 1, and line 31(1) will receive a pulse at pulse time 2, representing a read-out of fourteen. Since the counter read out is always even, there is no conflict with the read-out of the supplementary digit.

At pulse time 1 of the second subtraction cycle, the remainder in the store 3 will start reading out on to the highway 30. There will be no readout from the dividend store 2, since the first subtract trigger 10 is now unset, and holds down the potential of the line D5 through the inverter 77. The line D7 holds open the gates 23 to allow the value in store 2 to re-circulate and hold open gates 49 to allow the read-out from store 3 to pass on to highway 30.

The supplementary digit is read out on the line 31(1) as before. The stage CT1 of the counter QC is set, so that a pulse is also applied to the line 31(2). Hence three will be subtracted from the remainder in the store 3, and the new remainder re-entered in the store. At the end of the subtraction a further pulse will be entered in the counter QC.

Further subtractions take place in a similar manner until the remainder goes negative. The successive steps are set out below.

| Beginning of Subtraction | Store 3 | Quotient Counter | Highway 30 | Highway 31 | Remainder after Subtraction |
|---|---|---|---|---|---|
| 1 | 00—00 | 0 | 00—98 (from store 2) | 00—01 | 00—97 |
| 2 | 00—97 | 1 | 00—97 | 00—03 | 00—94 |
| 3 | 00—94 | 2 | 00—94 | 00—05 | 00—89 |
| 4 | 00—89 | 3 | 00—89 | 00—07 | 00—82 |
| 5 | 00—82 | 4 | 00—82 | 00—09 | 00—73 |
| 6 | 00—73 | 5 | 00—73 | 00—11 | 00—62 |
| 7 | 00—62 | 6 | 00—62 | 00—13 | 00—49 |
| 8 | 00—49 | 7 | 00—49 | 00—15 | 00—34 |
| 9 | 00—34 | 8 | 00—34 | 00—17 | 00—17 |
| 10 | 00—17 | 9 | 00—17 | 00—19 | 99—98 |

It will be seen that the odd numbers are read out in order on the highway 31 in successive subtractions. These numbers are the differences between successive squares, so that in effect, a test is made to determine which square causes the remainder to go negative. In the present case, the odd numbers from 1 to 19 have to be subtracted to make the remainder negative. This is equivalent to subtracting the square of ten from the remainder.

The gate 45 is closed under control of the line 599 and the inverter 44 when the remainder goes negative. This prevents the pulse following the tenth subtraction being entered into the counter QC, which continues to register nine.

A gate 43 receives pulses in common with the gate 45. The gate 43 is opened by the rise in potential on the line 599, and it feeds the pulse after the tenth subtraction to a gate 48, which is held open by the potential on the line SR. The output from the gate 48 sets a quotient trigger 50. The set output of this trigger is fed to an add trigger 51 to set it. The set output of the trigger 51 is fed to the unset side of the subtract trigger 18 to reset it. Hence, before pulse time 1, the subtract trigger has been reset, and the quotient and add triggers have been set to control the adding back of the last value which was subtracted from the remainder, and to enter the partial quotient into the store 1.

The gates 52 and 49 (FIGURE 1) are still held open so that the remainder will be read out to the highway 30, as on the previous cycle. The supplementary digit and double the value registered by the counter QC will also be read out as before, but the line A10 has now dropped in potential, so that the complementer 42 is ineffective, and the value on the highway 31 will be added to the remainder.

The line 599 also controls a gate 78, which receives pulses on a line T9. The pulse passed by this gate is supplied to unset the trigger 6. The gate 73 is closed when this trigger 6 is unset, so that the tenth pulse of the group 1–10 is not fed to the line 10C. The line P3 holds the gate 59 (FIGURE 1) closed since the subtract trigger 18 has been reset. The store 3 therefore, receives nine shift pulses instead of the normal eleven. This leaves the now positive remainder shifted two places to the left.

The shift pulses for the store 2 are fed to it by a line 9C, under control of a gate 53 (FIGURE 2). The gate 53 is controlled by an inverter 60, which receives a negative input from the add trigger 51, through inverters 76, 55 and 56. The inverter 60 also receives an input from line L1, through inverters 57 and 58. The line L1 is made positive by the timer PT during each pulse time 9. However, the negative output of the inverter 56 overrides any positive output of the inverter 58, so that the gate 53 is held open, and the line 9C receives ten shift pulses during each subtraction.

During the addition, the add trigger 51 is set, so that the inverter 56 provides a positive output. This is overridden by the negative output of the inverter 58, until pulse time 9, when this output also goes positive. This allows the inverter 60 to close the gate 53, to eliminate the ninth pulse to the line 9C. The tenth pulse is eliminated by the gate 73, so that the store 2 receives eight shift pulses, and the value is shifted left two places, to leave the next highest pair of dividend digits in the two least significant positions in the store.

The quotient trigger 50, when it is set, raises the potential of line M1, to open gates 54 (FIGURE 1). This allows the doubled value read out on highway 31 by the counter QC to be entered into the store 1, via cathode followers 86, lines 650 and the gates 54. There are only nine shift pulses on the line 10C, so that the units digit of the value is left in the next to least significant position. Cathode follower 87 prevents the supplementary digit being fed to the store 1.

The add trigger 51 also controls gates 69, 70, 71 and 72 in the counter QC, through the inverter 76. Each of the gates receives a pulse from the line T2, and provides a pulse to reset one of the stages of the counter. The gates 19 and 20 are closed by the subtract trigger 18, so that the carry between stages is suppressed and the counter is forcibly returned to zero.

Summarising, at the end of the addition, a lowest positive remainder is held in the store 3, with a left shift of two positions, the next pair of dividend digits to be read out are in the two lowest positions of the store 2, and double the partial quotient has been entered in the store 1, with a left shift of one position.

Gate 65 is held open by the add trigger 51, through the inverter 76, to allow a pulse on the line T11 to set the first subtract trigger 10, ready for the next subtraction cycle. At the same time a pulse passes through gates **27*a* and 74 to reset the add trigger 51 and the quotient trigger 50**, respectively.

The major cycle counter MC is used to count the number of major cycles. This counter may be set to register any desired value under control of manual plug connections, in a manner similar to that described in the applications referred to above. This allows the calculation to be terminated when the square root has been obtained to a predetermined accuracy.

When the add trigger 51 is set, it opens a gate 67, via the inverter 76. This allows a pulse on the line T11 to be fed through a gate 64 to the counter MC. The gate 64 is held open as long as the last stage of the counter is unset. Hence the registration of the counter is increased by unity at the end of each major cycle.

The subtraction steps of the first major cycle were set out in detail, and it will be seen that the remainder store 3 holds the number 9999999998 at the end of the last subtraction of the first cycle. The addition step at the end of the first major cycle effectively cancels the last subtraction step and also causes the contents of the remainder store to be shifted left by two positions, as noted above. Hence, at the end of the first major cycle, the remainder store 3 registers 0000001700.

The quotient counter QC is registering nine at the start of the addition step of the first major cycle and twice this value with a relative left shift of one place is read in to the result store 1. This leaves the result store registering 0000000180.

The dividend store 2 is registering 7654321000 at the start of the addition step. It has been explained above that the value in the dividend store is re-circulated during the addition step, but only eight shift pulses are applied to give a left shift of two places. Thus, at the end of the first major cycle, the dividend store registers 5432100076.

The first subtraction step of the second major cycle is functionally the same as the first subtraction step of the first major cycle, but, of course, the values registered by the various stores are different. The trigger 9 (FIGURE 2) opens the gates 12, 15 and 41 to allow the value in the result store 1 to be recirculated and to be read out to highway 31. Hence, the value 0000000180 is read out from the store. However, the gate 24 (FIGURE 2) is also opened to enter the supplementary one over line 31(1)

of the highway, so that the couplementer 42 receives the value 0000000181 over highway 31.

The first subtract trigger 10 and line L2 allow the gate 34 to open for two digit times only, so that the next two digits, 76, of the value in the dividend store 2 are read out to highway 30. The gate 49 is opened under control of the line D7 for the following eight digit times, so that the eight more significant digits of the remainder store 3 (namely 00000017) are combined with the two dividend digits (76) to form the value 0000001776 on the highway 30.

The subtraction cycles proceed until the remainder goes negative. An addition operation takes place, with shifting of the contents of the stores 2 and 3, entry of the next quotient digit, and entry of a further one in the major cycle counter MC.

If the major cycle counter has been plugged to allow the calculation of five quotient digits, then the last stage of the counter is set as a result of the entry of the pulse at the end of the fourth subtraction cycle. The fifth subtraction cycle proceeds normally, followed by the addition operation. However, the gates 63 and 64 are held closed by the last stage of the counter, which prevents setting of the first subtract trigger 10 and entry into the counter respectively, at pulse time 11.

The pulse from the gate 67 is passed by a gate 62, which is held open by the last stage of the counter MC, when it is set. The output of the gate 62 unsets the last stage of the counter. In unsetting, the last stage applies a pulse to gates 75 and 79. The output from the gate 75 unsets the divide trigger 9. The output of the gate 79 which is controlled by the line SR, sets a "halving" trigger 16.

The store 1 contains twice the square root, as already explained, and the final cycle to halve this value is controlled by the trigger 16. The potential of a line M8 is raised by the trigger 16, via, an inverter 87. This raises the potential of the line M2, through a cathode follower 88, a cathode follower 89 preventing interaction with the lines P2, etc. The line M8 opens gate 68 (FIGURE 1) to allow the value in the store 1 to be re-circulated through the halving circuit 66, under control of shift pulses from the gate 12. Hence, at the end of the final cycle, the correct square root value is standing in the store 1.

A gate 91 is held open by the set output of the trigger 16. This gate allows a pulse on the line T11 to reset the trigger and also to operate an inverter 90. The inverter produces an output pulse on a line OC, which is connected to an operation complete control circuit (not shown) which initiates the next arithmetic operation of the programme in a manner similar to that described in the applications referred to above.

It will be appreciated that the additional halving cycle can be saved in cases where it is not necessary to store the true square root in store 1. The halving in such cases can be effected during read out of the square root by taking the read out from the output side of the halver 66. Alternatively the count registered on the quotient counter could, in addition to being read out doubled for entry into store 1, be read out without doubling and entered into an additional store to build up the true square root.

I claim:

1. Apparatus for calculating the square root of a decimal dividend value including three storage registers for storing representations of the dividend value, a remainder value and a result value, respectively; read out means for each storage register operative, when energised, to read out in succession the digits of the value held in the register, the digits being represented by successively occurring electrical signals; a two input subtractor operable to form an output signal train representing the algebraic sum digit by digit of two signal trains applied to the two inputs thereof; calculating cycle control means operable to perform a series of major cycles, each of which includes at least one subtraction cycle; a quotient counter operable by the cycle control means to count the number of subtraction cycles in each major cycle; read out means for the quotient counter operable to read out electrical signals representing twice the value registered by the quotient counter; sign detection means responsive to the output signals of the subtractor to determine the sign of the value represented by such signals; and a unity pulse source operable to provide a signal representing unity; the cycle control means further including means operative during the first subtraction cycle of a major cycle to energise simultaneously the read out means of the dividend, remainder and result stores, the quotient counter and the unity pulse source to apply concurrently to one input of the subtractor signals representing a predetermined pair of digits registered in the dividend store and the value registered in the remainder store, and to apply concurrently to the other input of the subtractor signals representing the value registered by the result store, twice the value registered by the counter and unity and means operative on subsequent subtraction cycles of a major cycle to render the dividend register read means ineffective, the signals applied to each input of the subtractor forming a single signal train whereby the output signal train of the subtractor represents the result of subtracting the sum of unity and the values registered by the result storage register and quotient counter from the sum of two predetermined digits of the dividend and the value registered by the remainder storage register on the first subtraction cycle, and from the value registered by the remainder storage register on subsequent subtraction cycles; and further including means operative to apply the output signals from the subtractor to the remainder storage register to enter said algebraic sum therein; and means controlled by the detecting means and operative to apply a control signal to the cycle control means to cause termination of one major cycle, initiation of the next major cycle, and energisation of the quotient counter read out means to apply signals to the result storage register to enter a value therein.

2. Apparatus as claimed in claim 1, having signal gating means normally operative to pass a pulse from the cycle control means to the quotient counter for each subtraction cycle of a major cycle and means for rendering the signal gating means inoperative under control of the sign detection means.

3. Apparatus as claimed in claim 1, in which the subtractor includes a two input adder and a complementer, signals applied to one input of the subtractor being applied directly to one input of the adder and signals applied to the other input of the subtractor being applied to the other input of the adder through the complementer, and in which the cycle control means renders the complementer effective to apply to the adder signals representing the complement of the value representing signals applied to said other input of the subtractor during said subtraction cycles and renders the complementer ineffective for one addition cycle on receipt of said control signal and also renders effective the read out means of the remainder and result storage registers, the quotient counter and the unity pulse source to apply signals to the subtractor, whereby the value subtracted from the remainder value on the previous subtraction cycle is added to the remainder value on the addition cycle.

4. Apparatus as claimed in claim 3, in which each of the storage registers comprises a shifting register, and including a common source of shifting pulses for the registers and signal gating means controlling the application of the shift pulses to the registers, the gating means being controlled by the cycle control means during the addition cycle to cause the values registered by the remainder and dividend registers to be shifted two denominations to the left.

5. Apparatus as claimed in claim 4, in which the said value from the quotient counter read out means is entered into the result register during the addition cycle, and in which said signal gating means is controlled by the cycle control means to cause entry of said value with a shift of one denomination to the left.

UNITED STATES PATENTS

References Cited in the file of this patent 2,493,862 Durfee ---------------- Jan. 10, 1950

2,502,360 Williams --------------- Mar. 28, 1950

2,651,458 Bennett et al. ----------- Sept. 8, 1953

2,751,149 Young et al. ----------- June 19, 1956

OTHER REFERENCES

Lenaerts: "Automatic Square Rooting," Electronic Engineering, vol. 27, No. 329, pp. 287–289, July 1955.